United States Patent [19]
MacKinnon, Jr.

[11] Patent Number: 5,211,378
[45] Date of Patent: May 18, 1993

[54] DEVICE FOR INCREASING THE TENSION ON A CABLE OR THE LIKE

[76] Inventor: Donald T. MacKinnon, Jr., 19534 Warwick, Birmingham, Mich. 48009

[21] Appl. No.: 712,682

[22] Filed: Jun. 10, 1991

[51] Int. Cl.⁵ ............................ B66D 3/04; B63H 9/04
[52] U.S. Cl. .................................... 254/389; 24/71.3; 114/111
[58] Field of Search ............... 254/213, 223, 389, 199; 24/71.1, 71.2, 71.3; 114/102, 111; 242/85.1

[56] References Cited

U.S. PATENT DOCUMENTS

| | | | |
|---|---|---|---|
| 858,374 | 7/1907 | Dyer | 114/218 |
| 2,677,863 | 5/1954 | St. John | 24/127 |
| 3,078,534 | 2/1963 | McAdams | 24/71.1 |
| 3,145,684 | 8/1964 | Bolton, Jr. et al. | 114/218 |
| 3,398,714 | 8/1968 | Wallin et al. | 114/218 |
| 3,438,098 | 4/1969 | Grabner | 24/71.3 |
| 3,465,391 | 9/1969 | Armstong | 24/115 R |
| 3,467,994 | 9/1969 | Evans | 24/71.2 |
| 4,215,643 | 8/1980 | Jefferies et al. | 114/218 |
| 4,254,537 | 3/1981 | Malacheski et al. | 24/71.3 |
| 4,377,886 | 3/1983 | Golden | 24/71.1 |
| 5,012,559 | 5/1991 | Flannery | 24/71.3 |

*Primary Examiner*—Daniel P. Stodola
*Assistant Examiner*—Michael R. Mansen
*Attorney, Agent, or Firm*—Harness, Dickey & Pierce

[57] ABSTRACT

A tensioning device is provided for applying a tensioning force on a cable or rope used to secure a load by fixing its free end to an anchoring device. The device includes a pair of outwardly-protruding horn-like projections interconnected by a generally serpentine body, with one of the horns having friction-enhancing capabilities to prevent slippage of the cable or rope thereon, while the other horn functions similar to a pulley or block to provide a mechanical advantage in combination with the anchoring device.

17 Claims, 1 Drawing Sheet

DEVICE FOR INCREASING THE TENSION ON A CABLE OR THE LIKE

BACKGROUND AND SUMMARY OF THE INVENTION

The present invention relates generally to tensioning devices for allowing a user to apply a tensioning force to a cable, rope, or the like having a first cable end fixed to a load and a second, free cable end adapted to be secured to a fixed anchoring member, such as a cleat, stake, or any of a number of known anchoring members to which the free cable end can be secured in order to secure the load. More particularly, the present invention relates to a tensioning device that is quickly and conveniently installed and used, and that gives the user a significant mechanical advantage in its application.

Frequently, a load is secured in place by way of a cable, wire, rope, or other such elongated flexible member, which in turn can be manually or otherwise secured to a fixed anchoring member. Specific examples of this type of securing arrangement include tarps extending over a load on a truck or other transport vehicle, flags raised on a flagpole, sails on a sailboat, or any of a wide variety of other applications wherein a rope or cable is used to secure and hold a load or some cargo securely in a desired position. Often, such loads are heavy and difficult to manage and secure, and thus various schemes have been employed to gain a mechanical advantage and apply the proper tension on the rope or cable in order to secure the load or cargo.

One of the above-mentioned commonly-used arrangements for tensioning a cable, used in applications where the cable is relatively flexible, involves tying a portion of the cable into a knot having a loop extending therefrom, running the cable around the anchoring member, back through the loop, and then back to the anchoring member where the cable can be securely wrapped. This arrangement functions generally in the same manner as a pulley or block-and-tackle arrangement, giving the user a mechanical advantage in properly tensioning the cable or rope prior to securing its free end to the anchoring member. Unfortunately, however, this arrangement suffers from the disadvantage that the knot is inconvenient and frequently difficult to untie when the load is to be released, as well as causing damage to the cable or rope.

Other devices and contrivances have been commonly used in order to assist the user in tensioning the cable and securing the load, but also suffer from the disadvantages of being inconvenient or difficult to use, or in some cases even resulting in a weakening of a portion of the cable or rope. Thus, the need has arisen for a simple, easily-used device for tensioning a load-supporting cable or rope, with the device capable of being quickly and easily installed, durable in use, and preferably also giving the user a mechanical advantage in order to assist him or her in tensioning the cable. The present invention seeks to provide such a tensioning device that is also inexpensive to manufacture, widely applicable to any of a number of cable tensioning applications, and which has no moving parts in its preferred form.

According to the present invention, a tensioning device is provided for applying tension to a cable, rope, or the like, with the cable having a first cable end fixed to a load and a second, free cable end adapted to be secured to a fixed anchoring member. The tensioning device according to the present invention preferably comprises an elongated rod-like body formed into a generally serpentine or S-like shape, with a pair of oppositely-facing bights and a midportion interconnecting the bights. A first, typically upper end of the body of the tensioning device extends laterally outwardly to form a first rod-like projection, which is referred to as a first horn. The second, opposite end of the body extends generally in the same laterally outward direction to form a second laterally outwardly-protruding horn at the opposite end of the body. The first horn is adapted to receive a first portion of the cable wrapped a plurality of times (preferably at least three times) therearound, with the second horn being adapted to receive a second portion of the cable passing around the second horn (less than once therearound) in order to change directions in which the cable extends. The midportion of the body is adapted to receive a third portion of the cable extending thereunder with the third cable portion being between, and interconnecting, the above-mentioned first and second portions of the cable.

Preferably, the first horn has a friction surface or other discontinuity thereon in order to substantially prevent slippage of the first portion of the cable, which is wrapped a plurality of times around the first horn. The second horn is adapted to allow slidable movement of the second portion of the cable, in a manner similar to that provided by a pulley or block in a block-and-tackle arrangement. Such friction feature on the first horn of the tensioning device can be accomplished by a number of discontinuities formed on the first horn. Such discontinuities can be provided by winding a generally helical rod or wire-like member a number of times around the first horn, with the bights of the helical rod member being serially spaced apart along the first horn a distance such that they receive and frictionally engage serial wraps of the first portion of the cable therebetween. Alternately, the first horn can have ribs, knurling, or any of a number of known surface discontinuities formed thereon in order to form such friction surface. The above-mentioned midportion of the body is spaced somewhat laterally outwardly relative to the bights on opposite sides thereof, with such spacing of the midportion of the body being adapted to receive and guidingly engage or direct the third portion of the cable between the first and second horns.

In a typical installation, the tensioning device is adapted to be installed on the cable with the cable first extending from the load to the first portion of the cable, which is wrapped a plurality of times around the first horn in a serially outward direction, and then to the third portion of the cable, which extends under the midportion of the body to be guided in its proper direction. From this third portion of the cable, the cable then extends to slidably extend around the fixed anchor member, and then back to the second portion of the cable, which slidably extends around the second horn of the tensioning device. From the second horn, the cable then extends to the free cable end, which can be pulled by the user to tension the cable and then secured by way of wrapping or otherwise attaching the free cable end to the anchoring member, thus allowing the user to anchor the load. In such an arrangement, the preferred tensioning device according to the present invention gives the user a mechanical advantage of approximately twice that provided without the tensioning device, less the effects of friction.

Additional objects, advantages, and features of the present invention will become apparent from the following description and the appended claims, taken in conjunction with the accompanying drawings.

DETAILED DESCRIPTION OF THE PREFERRED EMBODIMENTS

Figure 1:
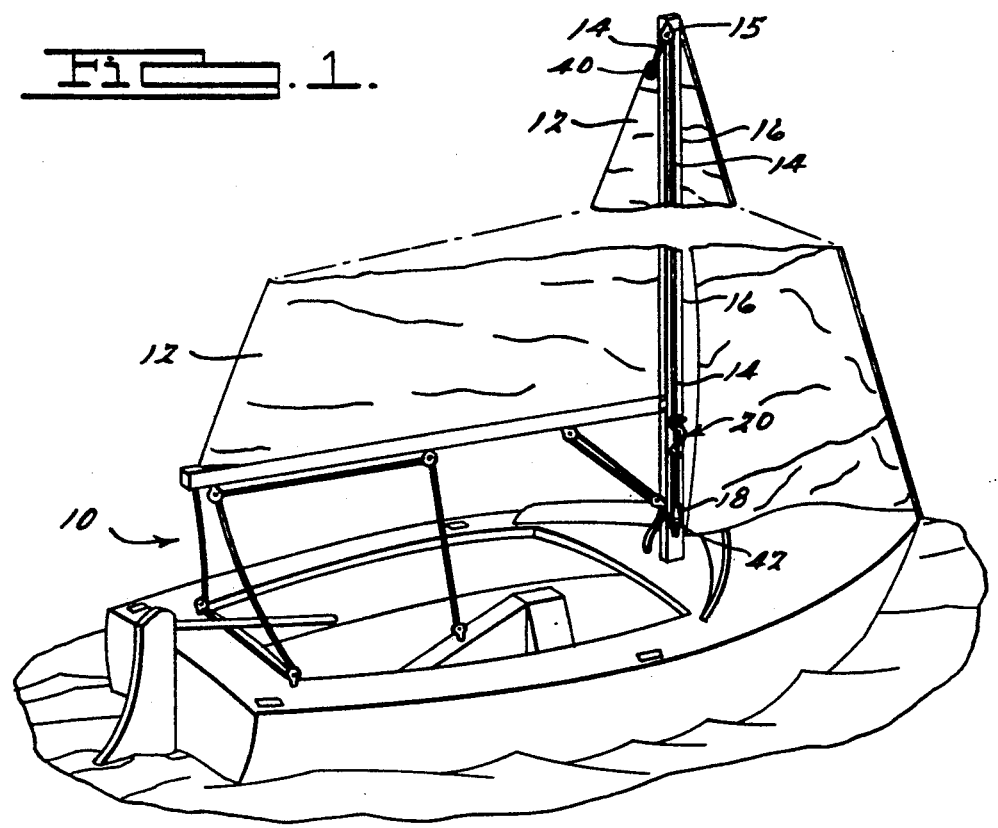
FIG. 1 depicts an illustrative application of an exemplary, preferred embodiment of a tensioning device according to the present invention, employed for purposes of assisting the user in securing a sail.

For purposes of ease of illustration of the invention, an exemplary tensioning device according to the present invention is depicted in FIGS. 1 through 5 as installed and employed for tensioning a halyard cable on a sailboat. One skilled in the art will readily recognize that FIGS. 1 through 5 depict merely one of many advantageous applications of the present invention, and will also appreciate, from the following discussion, that the tensioning device depicted in the drawings is shown merely for purposes of illustration and example, with the invention being capable of many variations.

FIG. 1 illustrates a sailboat 10, having a sail capable of being raised, lowered, and secured by way of a cable or halyard 14 extending from the sail 12 through a block 15, and down the mast 16 to a cleat or other such anchoring member 18. An exemplary tensioning device 20, illustrating a preferred form of the present invention, is employed for assisting the operator in tensioning the halyard or cable 14, and for securing it to the cleat or other anchoring member 18.

Figure 2:
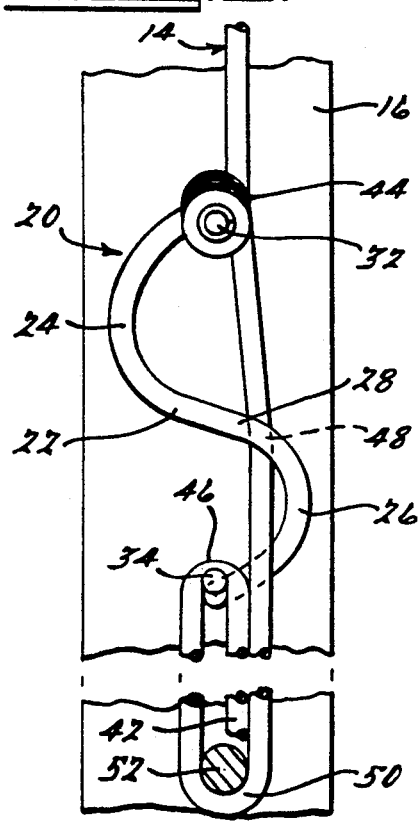
FIG. 2 is an enlarged elevational view of a portion of the mast of the sailboat depicted in FIG. 1, illustrating the exemplary tensioning device according to the present invention.
Figure 4:
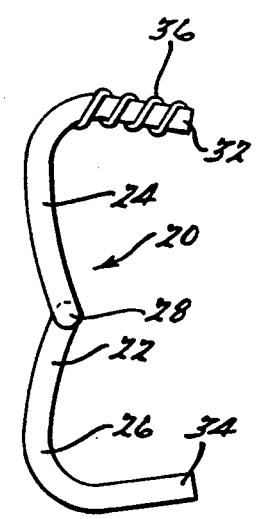
FIG. 4 is a view of the tensioning device, similar to FIG. 3, but with the tensioning device removed from its installation.
Figure 3:
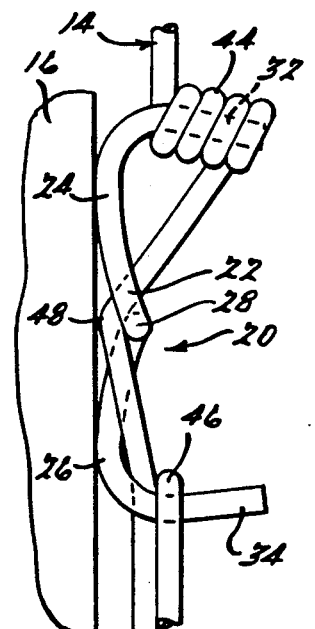
FIG. 3 is a side view of the tensioning device illustrated in FIG. 2.

As illustrated in FIGS. 2 through 4, the preferred tensioning device 20 includes a generally rod-like, elongated body 22, which is formed into a generally S-shape or serpentine shape, with a first bight 24 facing in an opposite direction from a second bight 26, and with a midportion 28 being disposed between and interconnecting the first and second bight portions 24 and 26. At a typically upper end of the body 22, a first horn 32 extends or protrudes in a laterally outward direction, with a second horn 34 being disposed at the opposite end of the body and extending generally in the same laterally outward direction.

The first horn 32 preferably includes a friction feature thereon, which in the form of the invention illustrated in FIGS. 2 through 4 is defined by a helical rod or wire member 36 tightly wrapped and welded or otherwise fixed generally helically around the first horn 32 a plurality of times. A first cable portion 44 is wrapped a plurality of times around the first horn 32, preferably with the wraps of the first cable portion 44 being serially disposed between serially adjacent bight portions of the helical rod member 36, and frictionally engaged thereby, such that the first cable portion 44 is substantially prevented from slipping on the first horn 32.

The cable then extends from the laterally outward end of the first horn 32 inwardly and downwardly under the midportion 28 of the tensioning device 20, whereupon it is guided downwardly to a fourth portion 50 that slidably extends around a post portion 52 of the cleat or anchoring member 18. The cable then extends upwardly to slidably engage and pass over the second horn 34, whereupon it then extends downwardly to the free cable end 42.

The user can apply a desired amount of tensioning force on the cable or halyard 14 by pulling downwardly, and can then secure the sail (or other load) merely by tightly wrapping or otherwise securing the free end 42 around the cleat or other anchoring member 18 in a manner well-known to those skilled in the art. By such an arrangement, the tensioning device can be conveniently secured to the cable 14 when tensioning and securing is desired, but is easily and quickly removed, without damaging or unduly wearing the cable 14. In addition, by virtue of the fourth portion 50 of the cable 14 slidably passing around the anchoring member post 52, and extending upwardly to the third cable portion 48 similarly slidably extending over the second horn 34, the tensioning device provides a mechanical advantage for the user of approximately twice that provided without the tensioning device, less the effects of friction resulting from the engagement of the third cable portion and the second horn 34, and the fourth cable portion 50 with the anchoring member post 52. In use, however, the friction forces that exist in a tensioned system advantageously enable the user to "hold" applied tension just prior to, and during, the act of securing the free end 42 to the anchoring member post 52.

Optionally, any of the embodiments of the inventive tensioning device can be interconnected with the mast 16 shown in the drawings, or with other structures at the point of use, so as to be conveniently at hand and so as to avoid being misplaced. Such interconnecting structures, although not expressly illustrated in the drawings, can include any of a number of well-known tethers, quick-release retaining clips, or other such devices that retain the tensioning device conveniently close at hand without interfering with its use.

Figure 5:
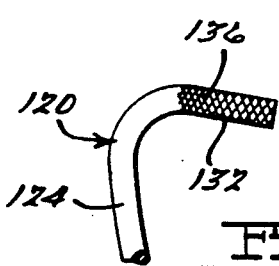
FIG. 5 is a partial view of an alternate tensioning device according to the present invention.

The friction feature provided by the helical rod or wire member 36 described above can, in most applications, be advantageously replaced by other types of friction-providing surface discontinuities on the first horn 32. One such example is illustrated in FIG. 5, wherein an alternate tensioning device 120 is substantially identical to the tensioning device 20 depicted in FIGS. 2 through 4, with the exception that the first horn 132 has knurling 136 formed thereon rather than the helical rod 36. Such knurled surface 136 can also alternately be replaced by ribs, grooves, grits, or any of another of known friction producing surface discontinuities. Optionally, in some lighter duty applications, such friction-enhancing means can be omitted, if desired, although the effectiveness of the device may be reduced. In all other respects, the configuration and function of the tensioning device 120 is substantially identical to that of the tensioning device 20 illustrated in FIGS. 2 through 4.

The foregoing discussion discloses and describes merely exemplary embodiments of the present invention for purposes of illustration only. One skilled in the art will readily recognize from such discussion, and from the accompanying drawings and claims, that various changes, modifications, and variations can be made therein without departing from the spirit and scope of the invention as defined in the following claims.

I claim:

1. A tensioning device for providing a mechanical advantage to aid in increasing the tension on a cable having a first cable end fixed to a load and a second, free cable end adapted to be secured to an anchoring means, said tensioning device being adapted to be used to increase tension on the cable prior to the free end being secured to said anchoring means, said tensioning device comprising an elongated body formed in a generally serpentine shape and having a pair of oppositely-facing bights lying generally in a single plane and a midportion between said bights, a first end of said body protruding in a laterally outward direction to form a first horn, and a second end opposite said first end protruding in said laterally outward direction to form a second horn, said first horn being adapted to receive a first portion of the cable wrapped therearound a plurality of times, and said second horn being adapted to receive and slidably engage a second portion of the cable wrapped less than one complete turn around said second horn in order to cause the second portion of the cable to extend to said second horn on one side thereof and away from said second horn on the other side thereof, said midportion of said body being adapted to receive a third portion of the cable extending thereunder with the third portion of the cable being between the first and second portions of the cable.

2. A tensioning device according to claim 1, wherein said first horn has friction means thereon in order to inhibit slippage of the first portion of the cable thereon.

3. A tensioning device according to claim 2, wherein said friction means includes discontinuities on the surface of said first horn.

4. A tensioning device according to claim 3, wherein said discontinuities are defined by a knurled surface on said first horn.

5. A tensioning device according to claim 3, wherein said discontinuities are defined by a generally helical rod member wrapped around said first horn with the bights of said helical rod member being serially spaced apart along said first horn to receive and frictionally engage serial wraps of the first portion of the cable therebetween.

6. A tensioning device according to claim 1, wherein said first and second horns extend laterally outwardly in a converging direction.

7. A tensioning device according to claim 6, wherein said first horn has friction means thereon in order to inhibit slippage of the first portion of the cable thereon.

8. A tensioning device according to claim 1, wherein said midportion of said body is spaced laterally outwardly relative to said bights in order to receive and guidingly engage the third portion of the cable between said first and second horns.

9. A tensioning device according to claim 8, wherein said tensioning device is adapted to be installed on the cable with the cable extending from the load to the first portion of the cable wrapped serially laterally outwardly a plurality of times around said first horn, and then from the first portion of the cable to the third portion of the cable extending under said midportion of said body of said tensioning device, from the third portion of the cable to slidably extend around the fixed anchor member and back to the second portion of the cable slidably extending around said second horn, and then from the second portion of the cable to the free cable end in order to allow a user to apply a tensioning force on the cable before securing the free cable end to the anchoring member in order to anchor the load, said tensioning device giving the user a mechanical advantage in applying said tension to the cable.

10. A tensioning device according to claim 1, wherein said second horn has sufficient strength so as to enable it to resist significant deflection in response to said increased tension on said cable.

11. A tensioning device according to claim 1, wherein said tensioning device is adapted to be removably fitted to said cable between said first and second ends.

12. A tensioning device for providing a mechanical advantage to aid in increasing the tension on a cable having a first cable end fixed to a load and a second, free cable end adapted to be secured to an anchoring means, said tensioning device being adapted to be used to increase tension on the cable prior to the free end being secured to said anchoring means, said tensioning device comprising an elongated body formed in a generally serpentine shape and having a pair of oppositely-facing bights lying generally in a single plane and a midportion between said bights, a first end of said body protruding in a laterally outward direction to form a first horn, and a second end opposite said first end protruding in said laterally outward direction to form a second horn, said first horn having friction enhancing means thereon being adapted to removably receive a first portion of the cable wrapped therearound a plurality of times to substantially prevent slippage thereon, and said second horn being adapted to removably receive and slidably engage a second portion of the cable wrapped less than one complete turn around said second horn in order to cause the second portion of the cable to extend to said second horn on one side thereof and away from said second horn on the other side thereof and be slidably movable thereon, said midportion of said body being spaced laterally outwardly relative to said bights and being adapted to guidingly receive and engage a third portion of the cable extending thereunder with the third portion of the cable being between the first and second portions of the cable.

13. A tensioning device according to claim 12, wherein said friction means includes discontinuities on the surface of said first horn.

14. A tensioning device according to claim 13, wherein said discontinuities are defined by a knurled surface on said first horn.

15. A tensioning device according to claim 13, wherein said discontinuities are defined by a generally helical rod member wrapped around said first horn with the bights of said helical rod member being serially spaced apart along said first horn to receive and frictionally engage serial wraps of the first portion of the cable therebetween.

16. A tensioning device according to claim 15, wherein said tensioning device is adapted to be installed on the cable with the cable extending from the load to the first portion of the cable wrapped serially laterally outwardly a plurality of times around said first horn, and then from the first portion of the cable to the third portion of the cable extending under said midportion of said body of said tensioning device, from the third portion of the cable to slidably extend around the fixed anchor member and back to the second portion of the cable slidably extending around said second horn, and then from the second portion of the cable to the free cable end in order to allow a user to apply a tensioning force on the cable before securing the free cable end to the anchoring member in order to anchor the load, said tensioning device giving the user a mechanical advantage in applying said tension to the cable.

17. A tensioning device according to claim 12, wherein said first and second horns extend laterally outwardly in a converging direction.

* * * * *

UNITED STATES PATENT AND TRADEMARK OFFICE
CERTIFICATE OF CORRECTION

PATENT NO. : 5,211,378
DATED : May 18, 1993
INVENTOR(S) : Donald T. MacKinnon, Jr.

It is certified that error appears in the above-identified patent and that said Letters Patent is hereby corrected as shown below:

Column 6, line 56, Claim 16, "15" should be --12--.

Signed and Sealed this

Eighteenth Day of January, 1994

Attest:

BRUCE LEHMAN

Attesting Officer  Commissioner of Patents and Trademarks